US010637849B2

(12) United States Patent
Elvira (10) Patent No.: US 10,637,849 B2
(45) Date of Patent: Apr. 28, 2020

(54) LOGON FILE IMPORT AND EXPORT FOR ONLINE WORKING ENVIRONMENTS

(71) Applicant: SAP SE, Walldorf (DE)

(72) Inventor: David Sierro Elvira, Heidelberg (DE)

(73) Assignee: SAP SE, Walldorf (DE)

( * ) Notice: Subject to any disclaimer, the term of this patent is extended or adjusted under 35 U.S.C. 154(b) by 261 days.

(21) Appl. No.: 15/617,238

(22) Filed: Jun. 8, 2017

(65) Prior Publication Data

US 2018/0359254 A1    Dec. 13, 2018

(51) Int. Cl.
*G06F 21/00*    (2013.01)
*H04L 29/06*    (2006.01)

(52) U.S. Cl.
CPC .......... *H04L 63/083* (2013.01); *H04L 63/102* (2013.01)

(58) Field of Classification Search
None
See application file for complete search history.

(56) References Cited

U.S. PATENT DOCUMENTS

| | | | | |
|---|---|---|---|---|
| 6,115,040 | A * | 9/2000 | Bladow | G06F 11/0709 715/741 |
| 7,519,908 | B2 | 4/2009 | Quang et al. | |
| 7,797,522 | B2 | 9/2010 | Zenz et al. | |
| 8,527,881 | B2 * | 9/2013 | Selig | G06F 17/243 715/738 |
| 8,955,080 | B2 | 2/2015 | Brunswig et al. | |
| 8,958,900 | B2 | 2/2015 | Steele et al. | |
| 9,450,945 | B1 | 9/2016 | Koeten et al. | |
| 9,461,986 | B2 | 10/2016 | Videlov et al. | |
| 9,461,996 | B2 | 10/2016 | Hayton et al. | |
| 2002/0029269 | A1 * | 3/2002 | McCarty | H04L 63/0815 709/225 |
| 2002/0107947 | A1 * | 8/2002 | Moragne | H04L 41/00 709/223 |
| 2005/0125677 | A1 * | 6/2005 | Michaelides | H04L 9/321 713/185 |
| 2008/0046369 | A1 * | 2/2008 | Wood | G06F 21/31 705/50 |

(Continued)

OTHER PUBLICATIONS

"Genie XMS Central Management Software User's Manual," Everfocus Electronics Corporation, Jan. 2015.

(Continued)

*Primary Examiner* — Shin-Hon (Eric) Chen
(74) *Attorney, Agent, or Firm* — Mintz, Levin, Cohn, Ferris, Glovsky and Popeo, P.C.

(57) ABSTRACT

A logon file import and export system and method for online working environments is disclosed, where the online working environment includes one or more enterprise systems to which a user has access. A graphical enterprise logon tool is generated for being rendered in a graphical display. The graphical enterprise logon tool includes an electronic access interface to each of the one or more enterprise systems, and an import/export feature graphically displayed in the enterprise logon tool. The import/export feature enables importation into or export out of the enterprise logon tool from or to a user, respectively, of a selected file. The selected file provides information about a selected system of the one or more enterprise systems in the enterprise logon tool, as well as information about the electronic access interface to the selected system.

15 Claims, 6 Drawing Sheets

(56) References Cited

U.S. PATENT DOCUMENTS

| | | | |
|---|---|---|---|
| 2008/0162341 A1* | 7/2008 | Zimmer | G06Q 40/02 |
| | | | 705/40 |
| 2008/0184125 A1* | 7/2008 | Suleiman | G06F 12/00 |
| | | | 715/734 |
| 2009/0222899 A1 | 9/2009 | Walters | |
| 2015/0215348 A1 | 7/2015 | Koeten et al. | |
| 2015/0365469 A1 | 12/2015 | Procopio et al. | |

OTHER PUBLICATIONS

"How to export and import server configuration settings," Exacq Technologies, Sep. 4, 2013.

\* cited by examiner

LOGON FILE IMPORT AND EXPORT FOR ONLINE WORKING ENVIRONMENTS

TECHNICAL FIELD

The subject matter described herein relates to logon tools for enterprise systems, and more particularly to a logon file import and export system and method for online working environments.

BACKGROUND

Employees of an enterprise that work in an online working environment typically have to use a logon tool every day to access the online working environment. The online working environment of the enterprise can include any of a number of applications, databases, intranets, or other information sources, all contained within a secured online presence and hosted by one or more servers, and can include both "cloud" and on-premise systems.

Further, all users of some enterprise online working environments have to work with different systems in the logon application or tool being employed. Normally, each user works every day with the same systems and even the same transactions. Currently, each day a user has to login to each system one-by-one, and then for each session look for the right transaction. This process can take from 5 to 10 minutes or more, every day for every user, and which is very time-consuming. Additionally, if a session expires or simply gets disconnected (e.g. after some time without using it such as during lunch, meetings, etc.), then the user will have to repeat the login process for all of the systems.

Often, users or administrators of the online working environment must add new systems to it. For instance, in a project implementation, every time a new user joins, the join process typically includes a request for every system detail. This process needs to be repeated for each system the new user joins, and the process of providing system details to a new user is very time consuming given that often these system details are transferred electronically in emails or word documents, in which another person must enter the details manually. Or, the new user must do extensive research online to know which person in the organization can provide them with the sought-after system details.

Currently, in most conventional online working environments, there is no integration between a logon tool of an enterprise's online working environment and its associated cloud-based systems. Users typically find it confusing and time consuming when trying to access such systems. For instance, there are different systems that may have the same name, but one of them is a cloud system and the other is a local logon system. A user does not know which system to access by knowing only the system identifier (ID). The user must look for the desired system, which is not trivial, and which can yield several results, all of which adds considerable time for accessing the correct system. Additionally, login into a cloud environment is currently time consuming because the users must login into the cloud, which requires its own password, which may or may not be unique.

Further, accessing a cloud system through the web is very time consuming and carries additional risks associated with the web, such as browser version issues, session expiration, etc. Thus, logging in to cloud systems requires an additional password and knowledge of the right area(s) within the online working environment to be searching. While the system details may be shared with users of the online working environment, a recipient of such information may not even know if the system is available in the business entity logon or in the cloud. Often, same system name exists in both.

In yet another case, in a typical enterprise system, whenever a user, such as a customer, wants to get an incident solved, such as through one or more information management system (IMS) departments, that user must generate a new username and password that is accessible through a business continuity planning (BCP) system. Then, to access this BCP system, the user must note or store their user details. Next, the user must login to a system via a logon system, such as SAP's IP7 Login system, and look for the available systems connected with the customer. Once accessed, the user must enter the details they obtained from the BCP system.

SUMMARY

This document presents a system and method for integrating cloud-based systems into an enterprise logon system to avoid needing a separate password or to perform additional steps in accessing the cloud-based systems.

This document further presents a novel feature in an enterprise system for importing and exporting all the system details in a single file. This functionality can be added as a new button in a user interface (UI), providing time savings, a single access point, safer access, less password and authorization problems, more comfortable for customers and consultants, and better appearance for sales activities.

In one aspect, a logon file import and export system and method for online working environments includes one or more enterprise systems to which a user has access, where the one or more enterprise systems are accessible by the user via a communication network. The system further includes a computer processor connected with the communication network, and a graphical enterprise logon tool generated by the computer processor and for being rendered in a graphical display connected with the computer processor.

The graphical enterprise logon tool includes an electronic access interface to each of the one or more enterprise systems. The graphical enterprise logon tool further includes an import/export feature graphically displayed in the enterprise logon tool, the import/export feature enabling an importation into or export out of the enterprise logon tool from or to a user, respectively, of a selected file, the selected file providing information about a selected system of the one or more enterprise systems in the enterprise logon tool, the information including information about the electronic access interface to the selected system.

Implementations of the current subject matter can include, but are not limited to, systems and methods consistent including one or more features are described as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

To address the issues with currently available logon and system detail solutions, this document presents systems and methods for integrating cloud-based systems into an enterprise logon system, as well as a systems and methods for importing and exporting all system details in a single file. In some implementations, functionality embodied as a system or method can be added as a new button in a UI.

Figure 1:
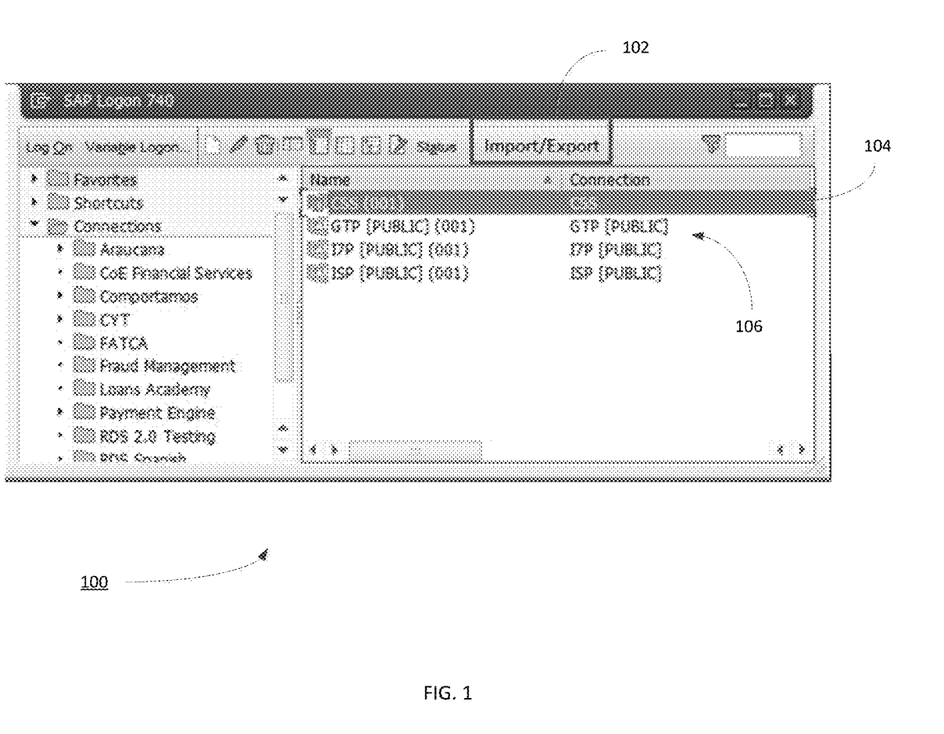
FIG. 1 illustrates an exemplary enterprise logon tool that is graphically represented by a computer processor, and provided in a UI of an electronic display connected with the computer processor.

In some implementations, and as shown in FIG. 1, an enterprise logon tool 100 is graphically represented by a computer processor, and provided in a UI of an electronic display connected with the computer processor. The enterprise logon tool 100 provides a logon function to one or more enterprise systems, which can include both local or on-premise systems and cloud-based systems. As described below, the enterprise logon tool 100 may provide an integrated logon function for both on-premise systems and cloud based systems. The enterprise logon tool 100 includes an import/export function 102, which imports and/or exports a selected file 104 from a set of systems 106, where each of the files/systems 104 and 106 are associated with an enterprise system. The selected file 104 has a determined file format (e.g. SAP System Details .ssd). The selected file 104 contains all the details about the system(s) a user is interested in, and has selected for the import/export function 102.

In such a way, every time there is a new user to join a project, the user or a project assistant using the enterprise logon tool 100 needs only to send (i.e. export) the selected file 104 containing details of all the relevant systems to the new user. The user and password details can also be included so that the user can automatically connect and login immediately, in a manner similar as provided by SAP® Single Sign-On. As an additional security feature, the file can be encrypted.

The features enabled by the import/export function 102 include exporting the selected file over a network, where the user chooses as many systems from a list of systems 106 as desired from their own enterprise logon and clicks on the export button represented by the import/export function 102. A file representing the selected file, or systems, will automatically be generated and containing all the information details. The features enabled by the import/export function 102 further include importing a selected file. In the case of an import, the user clicks on the logon import button represented by the import/export function 102 and browses the file (i.e. .ssd) received. The import/export function 102 can also provide for drag and drop of the file/systems. Automatically, all the relevant systems are added to a folder chosen by the user.

Figure 2A:
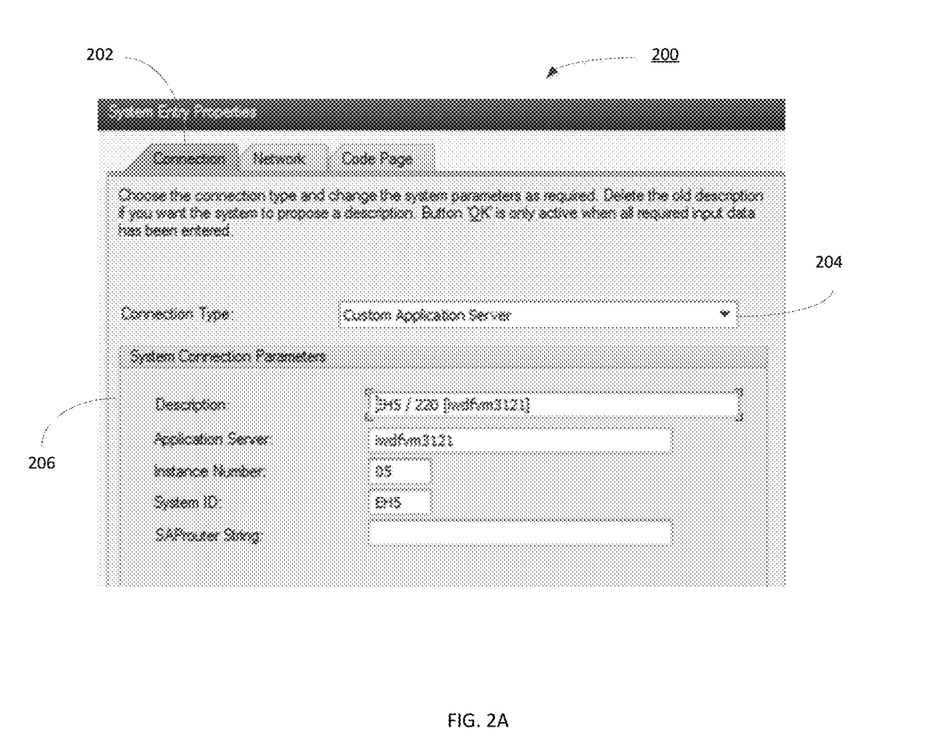
FIGS. 2A-2C illustrate a graphical representation of a selected file.
Figure 2B:
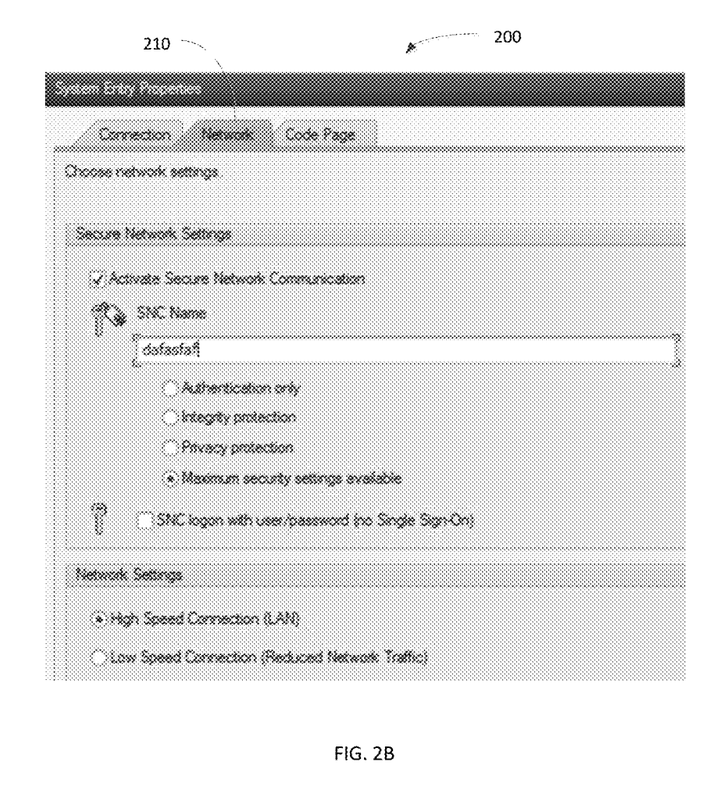
Figure 2C:
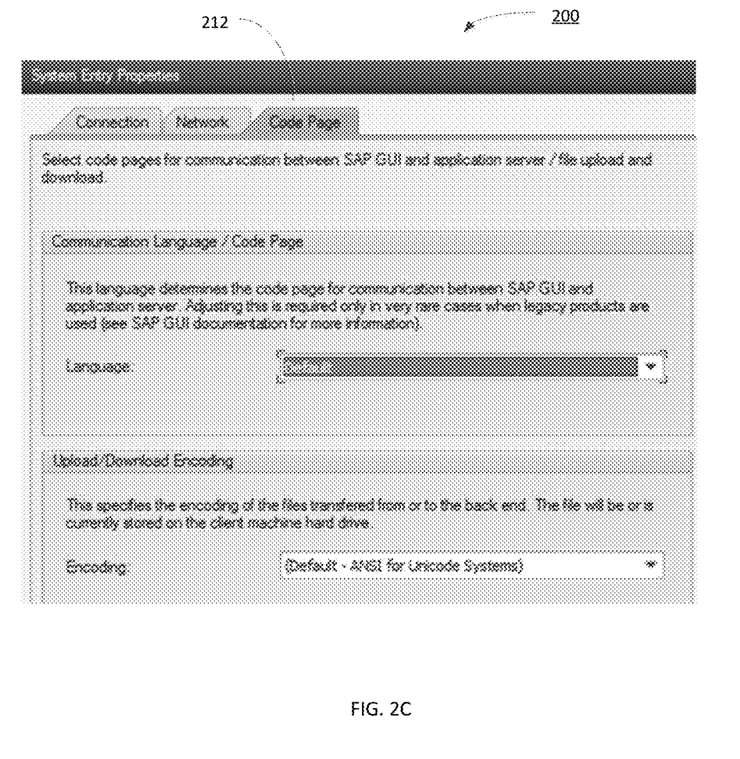

FIGS. 2A-2C illustrate a graphical representation 200 of a selected file 104, which can generate one or more windows of information for display in an electronic display. For each system, the selected file 104 contains information such as connection information 202, as shown in FIG. 2A. The connection can include information about electronic access interfaces, such as a connection type 204, such as via an application server for example, and one or more system connection properties 206, as shown in FIG. 2A, as well as user/pass information.

The graphical representation 200 of the selected file 104 can further contain information such as network information 210, as shown in FIG. 2B. The network information 210 can include information about secure network settings, unsecure networks settings, or the like, related to the one or more systems associated with the selected file 104. The graphical representation 200 of the selected file 104 can contain further information such as code page information 212, as illustrated in FIG. 2C. The code page information 210 can include information about communication languages, upload and download encoding, and the like, associated with the selected file 104. Additional enhancements can be applied to the selected file 104, such as creating an encrypted file. In case of encrypted files, this would enable the option of providing users and passwords already contained in the file 104 so that the user does not need to know the login details.

Figure 3:
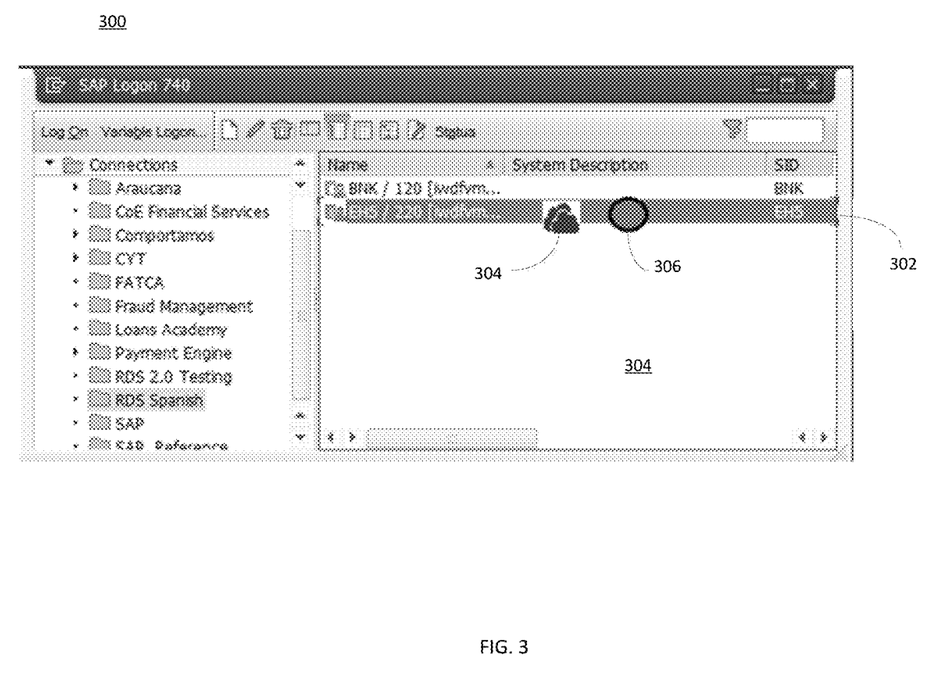
FIG. 3 shows a representation of a cloud system that is integrated into other systems controlled by the enterprise logon tool.

In some implementations, an enterprise logon tool can integrate one or more cloud systems to avoid extra steps for a user to login to such systems. FIG. 3 illustrates an enterprise logon tool 300 showing a representation of a cloud system 302 that is integrated into other systems controlled by the enterprise logon tool 300. The cloud system 302 can include a cloud designation 304, such as a cloud graphic, a text, or a symbol or the like, to designate the cloud system 302 as such. The user is able to differentiate the cloud systems from the users just by checking the cloud designation 304 next to it. The cloud system 302 can further include an activity designation 306, such as a traffic light (green, yellow or red, for instance), to indicate whether the cloud system is active or not, or whether the user is able to access the cloud system.

This idea would be the perfect complement for other registered (I entered it) idea called "SAP Logon Import"

which would provide all the system details in a file and in such a way, every time a user wants to share the system details with someone else, they would just to share the file and automatically the SAP logon tool would identify if it is a cloud system or not.

The SAP logon should be integrated with the Cloud systems logon in such a way that all the systems are simply displayed in the SAP logon tool and the user would only have to worry about the difference when adding them by checking if it is or not a Cloud system and additional details such as the room, client, etc.

In yet other implementations, an enterprise logon tool includes a feature that enables a session button that, once activated by a user, causes a dropdown list to appear with two options: Restore Last Session; and Open Work Session. The two options are further described below:

Restore Last Session: Restore all the sessions that were closed at last connection. This can be done by creating a profile that can be activated to track the last systems accessed, transactions, chat, etc. The Work Session can pop-up in a separate window with all the saved Work Session(s). Each Work Session contains a set of systems, transactions and data. In this pop-up, the user can create a new Work Session.

Open a saved session profile where every user can add/remove/modify the systems and transactions he wants to open with just one click. Transactions can contain data (parameters) that would populate the input fields.

Each user would only have to customize this session profile by entering one or more parameters such as system/client/user, transaction, etc. The next time the user wants to open all those different sessions and/or transaction with which the user works daily, the user need only has to click on this button.

Figure 4:
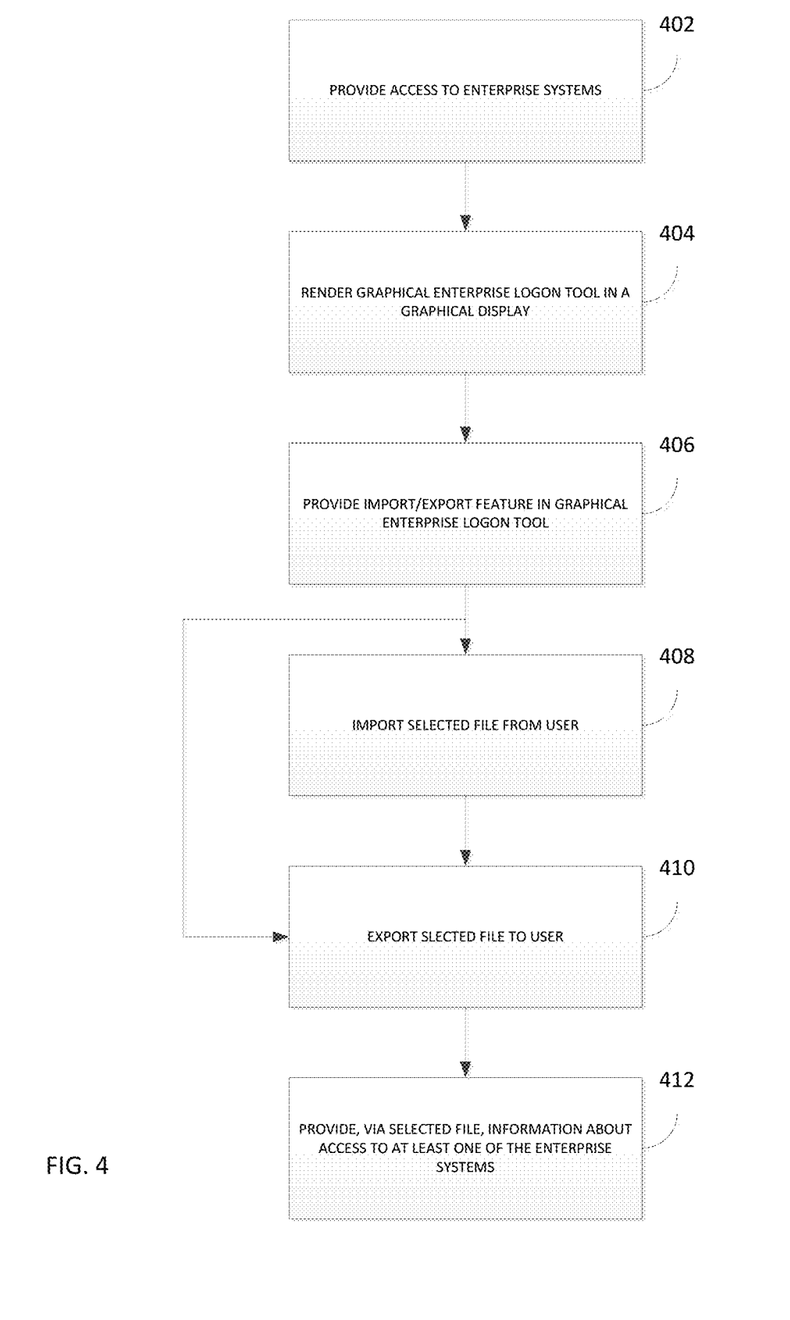
FIG. 4 is a flowchart of a method for logon import/export as executed by a system described herein.

FIG. 4 is a flowchart of a method executed by a logon file import and export system, in accordance with implementations disclosed herein. At 402, access to one or more enterprise systems is provided. The enterprise systems can include applications, databases, data repositories, or the like, and may be either an on-premise or a cloud-based system. In either implementation, each enterprise system is accessible via a communication network, such as a local area network (LAN) or via the Internet such as a secured Internet access connection.

At 404, an enterprise logon tool is rendered in a graphical display, such as by a computer processor in a server computer, a client computer, or the like. The graphical display is displayable on a computer display used by a user, such as in a user terminal or other computing system, such as a desktop computer, laptop computer, tablet computer, or other mobile computing device. At 406, the enterprise logon tool provides an import/export feature, such as a user-selectable button or other type of graphical control, which can be selected by a user to activate the logon tool. At 408 and/or 410, respectively, the enterprise logon tool imports and/or exports a selected file from or to a user. The selected file provides, at 412, information about a selected system of the one or more enterprise systems in the enterprise logon tool, the information including information about the electronic access interface to the selected system among other information.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT), a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A logon file import and export system for online working environments, the system comprising:
   a plurality of enterprise systems to which a user computer has access, the plurality of enterprise systems being accessible by the user computer via a communication network;
   a computer hardware processor connected with the communication network; and
   a graphical enterprise logon tool generated by the computer hardware processor and for being rendered in a graphical display connected with the computer hardware processor, the graphical enterprise logon tool comprising:
      an electronic access interface to the plurality of enterprise systems;
      an export feature graphically displayed in the graphical enterprise logon tool, the export feature enabling an export out of the graphical enterprise logon tool to the user computer of a selected file, the selected file providing information about the plurality of enterprise systems in the graphical enterprise logon tool, the information including information about the electronic access interface to the one or more plurality of enterprise systems; and
      an import feature graphically displayed in the graphical enterprise logon tool, the import feature enabling an importation into the graphical enterprise logon tool from the user computer of the selected file providing information to access the plurality of enterprise systems.

2. The system in accordance with claim 1, wherein the information includes connection information associated with the plurality of enterprise systems.

3. The system in accordance with claim 1, wherein the information includes network information associated with the plurality of enterprise systems.

4. The system in accordance with claim 1, wherein the information includes code page information associated with the plurality of enterprise systems.

5. The system in accordance with claim 1, wherein the information includes user and/or password information associated with the plurality of enterprise systems.

6. A computer-implemented method for logon file import and export for online working environments, the method comprising:
   providing access, via a communication network, for a user computer to a plurality of enterprise systems;
   rendering, in a graphical display generated by a computer hardware processor, a graphical enterprise logon tool, the graphical enterprise logon tool comprising an electronic access interface to the plurality of enterprise systems, and an import and/or export feature graphically displayed in the graphical enterprise logon tool;
   exporting out of the import and/or export feature of the graphical enterprise logon tool to the user computer a selected file, the selected file providing information about the plurality of enterprise systems in the graphical enterprise logon tool, the information including information about the electronic access interface to the plurality of enterprise systems; and
   importing into the import and/or export feature of the graphical enterprise logon tool from the user computer the selected file providing information to access the plurality of enterprise systems.

7. The system in accordance with claim 6, wherein the information includes connection information associated with the plurality of enterprise systems.

8. The system in accordance with claim 6, wherein the information includes network information associated with the plurality of enterprise systems.

9. The system in accordance with claim 6, wherein the information includes code page information associated with the plurality of enterprise systems.

10. The system in accordance with claim 6, wherein the information includes user and/or password information associated with the plurality of enterprise systems.

11. A system comprising:
    at least one hardware processor; and
    a non-transitory machine-readable medium storing instructions that, when executed by the at least one hardware processor, cause the at least one hardware processor to perform operations comprising:
       providing, via a communication network, access for a user computer to a plurality of enterprise systems;
       rendering, in a graphical display generated by a computer processor, a graphical enterprise logon tool, the graphical enterprise logon tool comprising an electronic access interface to the plurality of enterprise systems, and an import and/or export feature graphically displayed in the graphical enterprise logon tool; and
       exporting out of the import and/or export feature of the graphical enterprise logon tool to the user computer a selected file, the selected file providing information about the plurality of enterprise systems in the graphical enterprise logon tool, the information including information about the electronic access interface to the plurality of enterprise systems; and
       importing into the import and/or export feature of the graphical enterprise logon tool from the user computer the selected file providing information to access the plurality of enterprise systems.

12. The system in accordance with claim 11, wherein the information includes connection information associated with the plurality of enterprise systems.

13. The system in accordance with claim 11, wherein the information includes network information associated with the plurality of enterprise systems.

14. The system in accordance with claim 11, wherein the information includes code page information associated with the plurality of enterprise systems.

15. The system in accordance with claim 11, wherein the information includes user and/or password information associated with the plurality of enterprise systems.

* * * * *